United States Patent
O'Haire et al.

(10) Patent No.: US 11,375,769 B2
(45) Date of Patent: Jul. 5, 2022

(54) ENGINEERED BRAIDED TUBE

(71) Applicant: adidas AG, Herzogenaurach (DE)

(72) Inventors: Tom O'Haire, Nuremberg (DE); Andrew Yip, Nuremberg (DE)

(73) Assignee: ADIDAS AG, Herzogenaurach (DE)

( * ) Notice: Subject to any disclaimer, the term of this patent is extended or adjusted under 35 U.S.C. 154(b) by 546 days.

(21) Appl. No.: 16/016,345

(22) Filed: Jun. 22, 2018

(65) Prior Publication Data
US 2018/0368510 A1    Dec. 27, 2018

(30) Foreign Application Priority Data
Jun. 27, 2017  (DE) .......................... 102017210821.5

(51) Int. Cl.
*A43B 7/1405*    (2022.01)
*D04C 1/06*    (2006.01)
(Continued)

(52) U.S. Cl.
CPC ................ *A43B 7/141* (2013.01); *A43B 1/04* (2013.01); *A43B 1/14* (2013.01); *A43B 5/00* (2013.01); *A43B 23/026* (2013.01); *A43B 23/027* (2013.01); *A43B 23/0255* (2013.01); *A43B 23/0265* (2013.01); *A43B 23/0275* (2013.01);
(Continued)

(58) Field of Classification Search
CPC .. A43B 7/141; A43B 1/04; A43B 1/14; A43B 5/00; A43B 23/0265; A43B 23/042; A43B 23/0255; A43B 23/026; A43B 23/027; A43B 23/0275; D04C 1/02; D04C 1/06; D04C 3/40
See application file for complete search history.

(56) References Cited

U.S. PATENT DOCUMENTS 3,421,406 A * 1/1969 Mitchell .................. D04C 3/18
                                                            87/30
5,397,365 A * 3/1995 Trentacosta ........ A61F 2/30965
                                                            606/76
(Continued)

FOREIGN PATENT DOCUMENTS

DE      102012205906       10/2013
DE      102012112732        6/2014
(Continued)

OTHER PUBLICATIONS

Chinese Application No. 201810680386.3, Office Action dated Sep. 23, 2019, 48 pages (27 pages of translation and 21 pages of Original document).
(Continued)

*Primary Examiner* — Shaun R Hurley
*Assistant Examiner* — Bao-Thieu L Nguyen
(74) *Attorney, Agent, or Firm* — Kilpatrick Townsend & Stockton LLP

(57) ABSTRACT

A braided component for an article of apparel or footwear may be formed by application of a method that utilizes a braiding machine to braid a plurality of braiding yarns to form a tubular structure with a plurality of axial yarns incorporated into the tubular structure during braiding. At least two different types of axial yarn may be incorporated into the braided component, for example, to provide different properties to different parts of the tubular structure.

25 Claims, 9 Drawing Sheets

(51) Int. Cl.

| | |
|---|---|
| *D04C 1/02* | (2006.01) |
| *A43B 1/04* | (2022.01) |
| *A43B 23/02* | (2006.01) |
| *A43B 23/04* | (2006.01) |
| *A43B 1/14* | (2006.01) |
| *A43B 5/00* | (2022.01) |
| *D04C 3/40* | (2006.01) |
| *B32B 5/02* | (2006.01) |
| *B32B 5/08* | (2006.01) |

(52) U.S. Cl.
CPC ............ *A43B 23/042* (2013.01); *B32B 5/028* (2013.01); *B32B 5/08* (2013.01); *D04C 1/02* (2013.01); *D04C 1/06* (2013.01); *D04C 3/40* (2013.01); *D10B 2401/041* (2013.01); *D10B 2401/061* (2013.01); *D10B 2403/0112* (2013.01); *D10B 2403/02411* (2013.01); *D10B 2501/043* (2013.01)

(56) References Cited

U.S. PATENT DOCUMENTS

| | | | | |
|---|---|---|---|---|
| 5,899,134 | A * | 5/1999 | Klein | D04C 1/02 87/9 |
| 8,757,038 | B2 * | 6/2014 | Siegismund | D04C 3/48 87/34 |
| 10,905,189 | B2 * | 2/2021 | Bruce | A43B 23/0245 |
| 2002/0161388 | A1 * | 10/2002 | Samuels | D04C 3/48 606/192 |
| 2010/0023047 | A1 * | 1/2010 | Simpson | A61M 25/1002 606/192 |
| 2014/0130270 | A1 | 5/2014 | Baudouin et al. | |
| 2014/0157974 | A1 * | 6/2014 | Cahuzac | D04C 1/02 87/33 |
| 2014/0245633 | A1 | 9/2014 | Podhajny | |
| 2014/0377488 | A1 * | 12/2014 | Jamison | A43B 23/042 428/36.1 |
| 2015/0007451 | A1 * | 1/2015 | Bruce | D04C 1/06 36/83 |
| 2015/0272274 | A1 | 10/2015 | Berns et al. | |
| 2016/0166007 | A1 | 6/2016 | Bruce et al. | |
| 2016/0345674 | A1 * | 12/2016 | Bruce | D04C 1/06 |
| 2016/0345675 | A1 | 12/2016 | Bruce et al. | |
| 2016/0345676 | A1 * | 12/2016 | Bruce | A43B 23/042 |
| 2016/0345677 | A1 | 12/2016 | Bruce et al. | |
| 2017/0035149 | A1 * | 2/2017 | Bruce | D04C 3/08 |
| 2017/0143059 | A1 * | 5/2017 | Gallagher | B32B 7/08 |
| 2017/0167062 | A1 * | 6/2017 | Malloy | H02G 3/0481 |
| 2018/0020762 | A1 * | 1/2018 | Jamison | D04C 1/10 428/36.1 |
| 2018/0049509 | A1 * | 2/2018 | Zwick | A43B 23/0295 |
| 2018/0343958 | A1 * | 12/2018 | Bruce | A43D 8/08 |
| 2018/0343959 | A1 * | 12/2018 | Bruce | D04C 3/18 |
| 2018/0343960 | A1 * | 12/2018 | Bruce | A43B 1/04 |
| 2018/0343963 | A1 * | 12/2018 | Bruce | D04C 1/06 |
| 2018/0368506 | A1 * | 12/2018 | Bruce | A43B 23/042 |
| 2020/0375316 | A1 * | 12/2020 | Dealey | A43B 1/04 |

FOREIGN PATENT DOCUMENTS

| | | |
|---|---|---|
| DE | 102013226673 | 6/2015 |
| DE | 102014000302 | 7/2015 |
| DE | 102015116398 | 3/2017 |
| DE | 69732664 | 4/2018 |

OTHER PUBLICATIONS

European Application No. 18179794.5, Office Action dated Oct. 8, 2019, 5 pages.
German Patent Application No. 102017210821.5, Office Action dated Mar. 13, 2018, 20 pages (English machine translation attached).
Potluri et al., "Geometrical Modelling and Control of a Triaxial Braiding Machine for Producing 3D Preforms", Composites Part A: Applied Science and Manufacturing vol. 34, Issue 6, 2003, pp. 481-492.
Goff, "The geometry of tubular braided structures", MSc Thesis, 1976, Georgia Institute of Technology, 145 pages.
European Patent Application No. 18179794.5, Extended European Search Report dated Nov. 6, 2018, 8 pages.
Chinese Patent Application No. 201810680386.3, Office Action dated Apr. 14, 2020, 10 pages (English Machine Translation provided).
German Patent Application No. 102017210821.5, Office Action dated Mar. 5, 2020, 9 pages (English Machine Translation provided).
European Patent Application No. 18179794.5, Office Action dated May 20, 2020, 5 pages.
German Patent Application No. 102017210821.5, Office Action dated Apr. 26, 2021, 11 pages (English machine translation provided).
European Patent Application No. 18179794.5, Intent to Grant dated Feb. 8, 2021, 8 pages.

\* cited by examiner

FIG 4
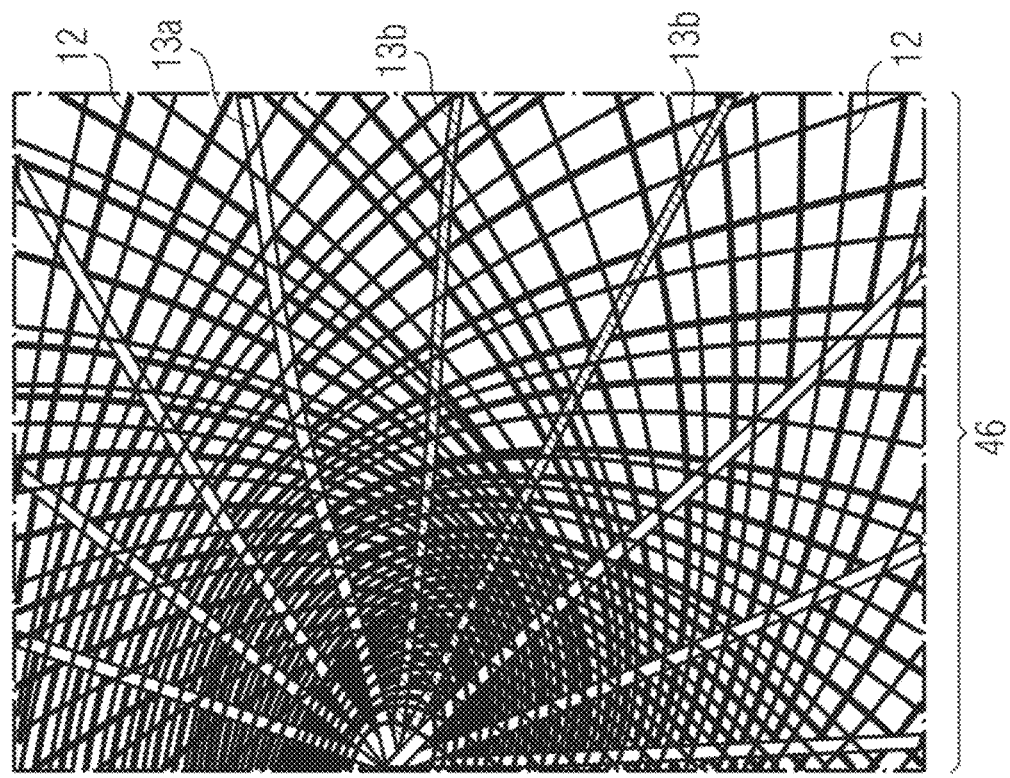
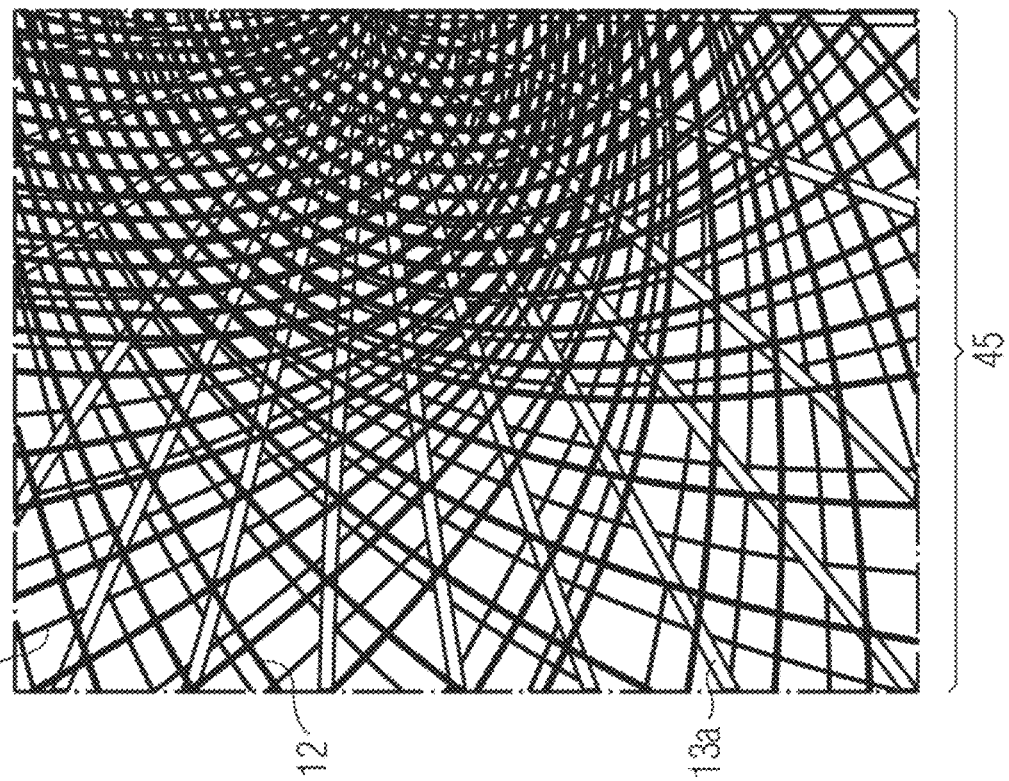

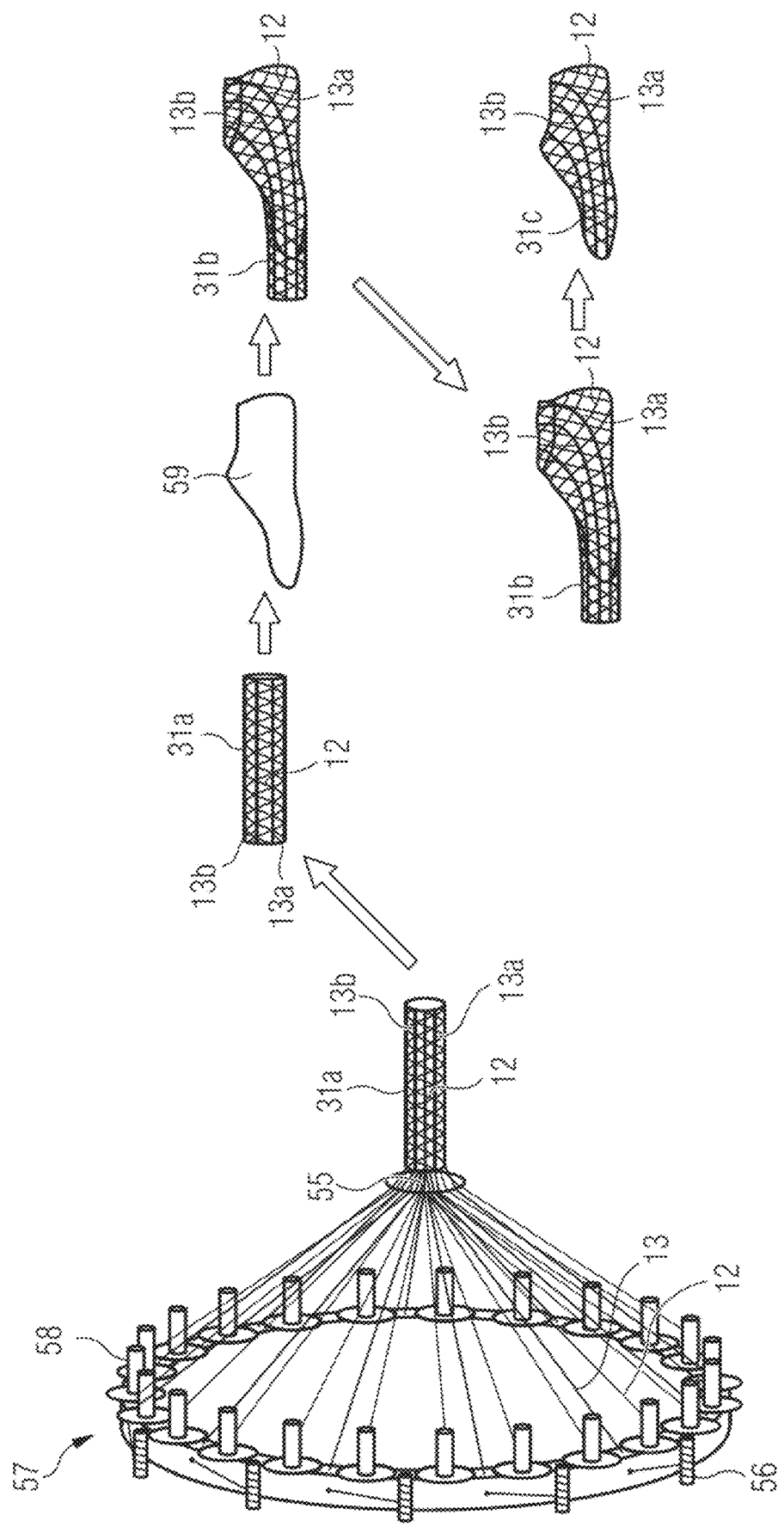

ENGINEERED BRAIDED TUBE

CROSS REFERENCE TO RELATED APPLICATION

This application is related to and claims priority benefits from German Patent Application No. DE 10 2017 210 821.5, filed on Jun. 27, 2017, entitled ENGINEERED BRAIDED TUBE ("the '821 application"). The '821 application is hereby incorporated herein in its entirety by this reference.

FIELD OF THE INVENTION

The present invention relates to methods for manufacturing a braided tube with engineered properties, such as for applications in apparel and footwear.

BACKGROUND

The wearing comfort and functionality of apparel or an article of footwear depends on many factors. For example in footwear, there needs to be a sufficient level of support for a particular type of activity such as walking, running, rock climbing, playing football, cycling and so on. The level of support required depends on the region of the foot. For example, the midfoot region frequently requires a greater level of support than the toe region. Further relevant properties of an article of footwear, or any apparel, comprise the breathability of the material, the level of permeability to water, and weight. In case of an article of footwear, the upper plays an important role in determining these properties. It is therefore of great importance to engineer the properties of an upper, or of a piece of apparel for a particular need.

For example, engineered knits and weaves may be used in footwear to vary the stiffness of a shoe by varying the knit and weave structure. Braiding technology, however, allows a geometric arrangement and a variety of braids to achieve a performance and level of tunability that is not possible with engineered knits or weaves.

A shoe upper may be manufactured by inserting a shoe last into a braiding machine and braiding over the last whilst guiding the last through the braiding machine. Another way of producing a braided upper for an article of footwear is by braiding over a forming mandrel located in proximity to the braiding zone, also known as braiding point, of a braiding machine and, in a second step, inserting a shoe last into the braided component to shape said braided component.

U.S. Pat. No. 8,757,038 discloses a method for producing an upper part of a shoe, in particular a sport shoe, with enhanced wearing comfort. The method entails supplying a shoe last, which corresponds to the inner shape of the upper part of the shoe, to a radial braiding machine having an annular creel, which is designed for weaving and/or braiding along three axes; guiding the at least one shoe last through the center of the creel and simultaneously weaving and/or braiding along three axes using a fiber material around the outer circumference of the shoe last; and terminating the weaving and/or braiding and removing the woven and/or braided material from the shoe last.

US 2016/0345677 discloses a braiding machine and a method of forming an upper that includes braiding over a forming last that passes from a first side of a braiding point to a second side of the braiding point.

US 2016/0166007 discloses a method of making an article of footwear including temporarily attaching a midsole structure to a last and inserting the midsole structure and footwear last through a braiding machine. A braided structure in the form of an upper is formed. The upper includes a midsole structure disposed within an interior cavity of the upper.

US 2016/0345676 discloses a method of forming a braided upper comprising: locating a forming mandrel above a braiding point of a braiding machine; braiding a plurality of strands to form a three-dimensional braided component; pulling the braided component over the forming mandrel; and inserting a last into the braided component to shape the braided component.

US 2016/0345674 discloses an article of footwear that is formed from multiple braided components. The braided components may be braided strands formed from different tensile elements. The tensile elements may have different cross-sections. The tensile elements may be from different materials. Different braided strands may then be overbraided over a last to form a braided upper for the article of footwear.

US 2016/0345675 discloses an upper for an article of footwear that is formed by incorporating different braided portions. The upper may be formed by incorporating a first braided portion with a second braided portion. The top portion of the upper may have the first braided portion. The lower portion of the upper may have the second braided portion.

US 2015/0007451 discloses an article of footwear including a braided upper comprised of a unitary braided structure. The unitary braided structure of the braided upper may be engineered with specific features tailored to particular activities. Different regions of the upper may have different braided configurations. For example, higher braid densities may be used in specific areas of the footwear to provide additional structural support or compression. Also, strands of a different material may be incorporated in different regions of the braided upper to provide specific properties to the footwear in those areas.

These existing methods for producing a braided shoe upper have several disadvantages however. The process of braiding over a shoe last is slow and mechanically complicated due to the complex shape of a shoe last. The process of braiding over a forming mandrel is similarly slow. The cost of both production methods is therefore high because the daily output of an expensive braiding machine, which usually also has a large footprint in terms of the area that is required to host such a machine, is rather low. Furthermore, expensive shoe lasts have to be produced to cover every shoe size and style.

Another disadvantage of the existing methods is that it is difficult to modularize the production process since the shoe lasts and the braiding machine have to be in the same physical location. As a further consequence, it is difficult to produce individually customized components with the existing methods. Furthermore, a braided component produced according to the existing methods cannot be used for applications outside of footwear in a straightforward manner.

An objective of the present invention may be to produce a braided component with low weight and high mechanical performance that may be engineered such that it has a range of applications in apparel and footwear with only minor modifications required. It may be beneficial for the engineering to also allow a more modular production process such that a product based on the braided component may be more easily individually customized than with existing methods. Furthermore, it may be beneficial for the production method to be faster and more cost-effective than existing methods.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method may be utilized for forming a braided component for an article of apparel or footwear on a braiding machine. The method may include braiding a plurality of braiding yarns to form the braided component so that the braided component comprises a tubular structure. The method may further include incorporating a plurality of axial yarns into the tubular structure during braiding, wherein at least two different types of axial yarn including at least a first type of axial yarn and a different, second type of axial yarn are incorporated into the braided component.

In some embodiments, the first type of axial yarn has a different composition than the second type of axial yarn.

In some embodiments, the first type of axial yarn has a different tex value than the second type of axial yarn.

In some embodiments, wherein the first type of axial yarn has at least one of a different elasticity or a different bending stiffness than the second type of axial yarn.

In some embodiments, an arrangement of the axial yarns varies over a circumference of the tubular structure of the braided component.

In some embodiments, a braiding angle is varied along an axial direction of the braided component.

In some embodiments, at least one of the braiding yarns or the axial yarns include at least one melt yarn.

In some embodiments, the first type of axial yarn is arranged in a first area of the braided component, but not in a second area, and wherein the second type of axial yarn is arranged in the second area, but not in the first area.

The method may further include forming an upper of the article of footwear from the braided component after the axial yarns have been incorporated. In some embodiments, the first area is located in a bottom portion of the upper and the second area is located in an instep portion of the upper. In some embodiments, the first area is located in at least one of a lateral or a medial portion of the upper and the second area is located in an instep portion of the upper. In some embodiments, the first area is located in a lateral portion of the upper and the second area is located in a medial portion of the upper.

In some embodiments, the braiding of the braided component is performed over an essentially cylindrical form. The essentially cylindrical form may include a meltable component. The method may further include melting the meltable component after braiding the braided component over the meltable component such that the braided component and the meltable component form one integral unit.

In some embodiments, the method may further include arranging the braided component on a last and consolidating the lasted braided component. In some embodiments, the consolidating include at least one of: using a binder; using a polymer coating; heating at least part of the braided component; or application of a lamination technique. In some embodiments in which the consolidating includes application of a lamination technique, the lamination technique may include the use of polyurethane, thermoplastic polyurethane ("TPU"), polyamide, polyolefins, or vinyl-based films. In some embodiments in which the consolidating includes application of a lamination technique, the lamination technique comprises vacuum forming.

According to certain embodiments of the present invention, a braided component for an article of apparel or footwear may have a tubular structure. The braided component may include a plurality of incorporated axial yarns. At least two different types of axial yarn including at least a first type of axial yarn and a different, second type of axial yarn may be incorporated into the braided component.

In some embodiments, the braided component's first type of axial yarn differs from the second type of axial yarn in at least one of: a composition; a tex value; an elasticity; or a bending stiffness.

In some embodiments, an arrangement of the axial yarns varies over the circumference of the tubular structure of the braided component. Additionally or alternatively, a braiding angle may be varied along an axial direction of the braided component. Additionally or alternatively, the braiding yarns and/or the axial yarns may include at least one melt yarn.

In some embodiments, an upper for the article of footwear comprises the braided component. The first type of axial yarn may be arranged in a first area of the braided component, but not in a second area. The second type of axial yarn may be arranged in the second area, but not in the first area. In some embodiments, the first area is located in a bottom portion of the upper and the second area is located in an instep portion of the upper. Additionally or alternatively, the first area may be located in at least one of a lateral portion or a medial portion of the upper and the second area may be located in an instep portion of the upper. Additionally or alternatively, the first area may be located in a lateral portion of the upper and the second area may be located in a medial portion of the upper.

In some embodiments, the upper comprises a laminate comprising at least one of a polyurethane material, a TPU material, a polyamide material, a polyolefin material, or a vinyl-based film.

According to certain embodiments of the present invention, a shoe may include an upper comprising a braided component having a tubular structure. The braided component may include a plurality of incorporated axial yarns. At least two different types of axial yarn including at least a first type of axial yarn and a different, second type of axial yarn may be incorporated into the braided component. The shoe may further include an outsole.

In some embodiments, the shoe's first type of axial yarn differs from the second type of axial yarn in at least one of: a composition; a tex value; an elasticity; or a bending stiffness.

In some embodiments, an arrangement of the axial yarns varies over the circumference of the tubular structure of the braided component; a braiding angle is varied along an axial direction of the braided component; or the braiding yarns and/or the axial yarns include at least one melt yarn.

In some embodiments, the first type of axial yarn is arranged in a first area of the braided component, but not in a second area, and the second type of axial yarn is arranged in the second area, but not in the first area. Additionally or alternatively, the first area may be located in a bottom portion of the upper and the second area may be located in an instep portion of the upper; the first area may be located in at least one of a lateral portion or a medial portion of the upper and the second area may be located in an instep portion of the upper; or the first area may be located in a lateral portion of the upper and the second area may be located in a medial portion of the upper.

BRIEF DESCRIPTION OF THE DRAWINGS

In the following detailed description, embodiments of the invention are described referring to the following figures:

FIG. 4 illustrates another example of a braided component according to some embodiments of the present invention;

FIG. 5 illustrates an example of a method of manufacturing a braided component and an upper for an article of footwear according to some embodiments of the present invention;

BRIEF DESCRIPTION

Figure 1A:
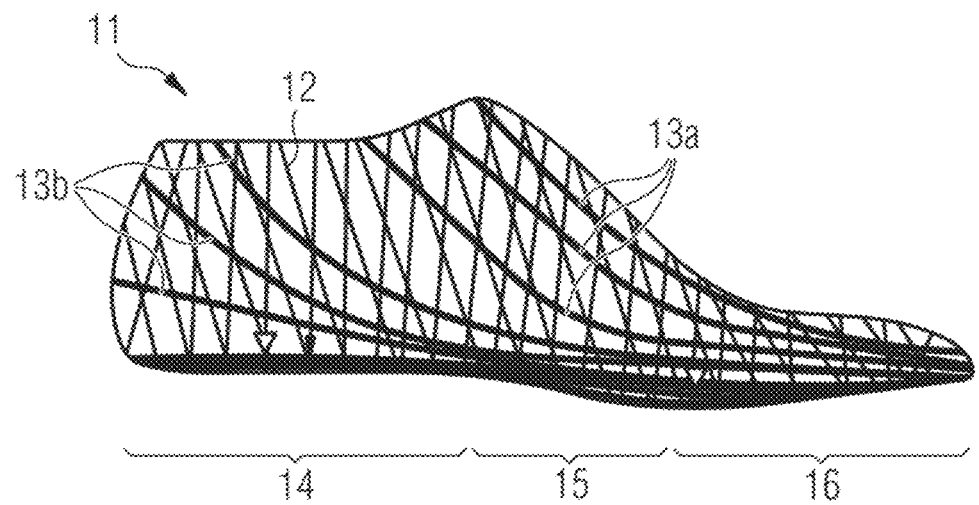
FIGS. 1A and 1B are side views of an example of a shoe upper according to some embodiments of the present invention.

Various embodiments herein concern a method of forming a braided component for an article of apparel or footwear on a braiding machine, comprising: (a) braiding a plurality of braiding yarns to form the braided component with a tubular structure and (b) incorporating a plurality of axial yarns into the tubular structure during braiding, wherein at least two different types of axial yarn are incorporated into the braided component.

Some embodiments herein further concern an upper for an article of footwear comprising a braided component which has been manufactured as described herein.

Some embodiments herein further concern a braided component for an article of apparel or footwear having a tubular structure, wherein the braided component comprises a plurality of incorporated axial yarns, and wherein at least two different types of axial yarn are incorporated into the braided component. Some embodiments herein further concern an upper of the article of footwear comprising the braided component as described herein.

Some embodiments herein further concern a shoe comprising an upper as described herein and an outsole. The shoe, for example a sports shoe, comprising the upper described herein is particularly lightweight and has excellent mechanical properties that may be easily modified, in the manufacturing process, for a particular type of activity or even the individual anatomy of a customer.

Braiding is the interlacing of three or more yarns in such a way that they cross one another and are laid together in a non-parallel formation, forming a narrow strip of flat or tubular structure. Braiding allows a geometric arrangement of triaxial braids that is not possible in weaving or knitting.

An axial yarn, sometimes also known as a standing yarn, or a longitudinal yarn, runs along an axial (also denoted as longitudinal) direction of the tubular structure. Each type of axial yarn comprises at least one axial yarn. Here, a tubular structure, or tube, is taken to mean a cylinder-like structure that may comprise deviations from a mathematically perfect cylinder. Said deviations may be deliberately incorporated or based on technical imperfections in the manufacturing process. Braiding yarns bind the axial yarns into a tubular structure. The resulting tube could be quite stiff in the axial direction but may be extendable and elastic along a radial direction of the tube.

The tube can also be engineered to provide at least two different regimes of stress-strain response. In the first regime, the tube obeys a substantially linear stress-strain relationship. Here the material may be substantially elastic, or compliant, and when the tube is pulled, the restoring force may be substantially proportional to the extension from equilibrium. In the first regime, the tube behaves substantially similar to a spring that obeys Hooke's law. In the second regime, the tube obeys a substantially non-linear stress-strain relationship and the restoring force increases more rapidly with an extension from equilibrium than in the first regime. The transition point between these two regimes may be referred to as "lock-out". This behavior can have an beneficial technical effect in apparel or footwear. In an illustrative example, the first regime may be engineered such that the player can comfortably get his foot into a shoe comprising the engineered tube. Continuing this example, the tube may also be sufficiently elastic to allow the player to run comfortably. Further in this example, the tube may be engineered such that when the player wants to change direction the shoe is stiff and provides a sufficient level of support for the player's foot.

There are other possible benefits to this method and/or for said braided components. Firstly, the incorporation of the plurality of at least two different types of axial yarn into the braided component allows a greater extent of tunability of the properties of the braided component than could otherwise be achieved. The axial yarns may be varied in a straightforward manner, for example, for different models of the braided component. It is possible to use radically different types of axial yarn in close proximity to one another without disturbing the manufacturing stability of the braided component. Radically different axial yarns are axial yarns whose properties differ significantly. These properties comprise, for example, composition, tex value, elasticity, bending stiffness, coating, cross-sectional area, and melt yarn content. This is a distinct advantage of braiding and braided components over the processes of weaving or knitting or components produced through weaving or knitting, where this would not be possible. In weaving or knitting, the use of radically different yarns would cause defects such as puckering. Furthermore, yarns have to be more flexible in knitting because the yarns themselves are bent in the knitting process. With braiding, the yarns are not bent during the braiding process so yarns could be stiffer and therefore a greater variation of yarns may be used. Furthermore, in weaving and knitting, the choice of yarn is often determined by needle gauge or reed density. Thus, it would be difficult to mix fine and coarse yarns. With braiding, each package is completely independent, and there are no common eyelets or "gauges" that the yarn needs to pass through. The only requirement is that the yarns can pass over and under each other with some frictional contact. Secondly, the properties of the braided component may be engineered to eliminate the need for a forming mandrel or a shoe last to form an upper for an article of footwear during the braiding process. Therefore, the speed of production of a braided upper may be increased and the cost of a braided upper may be decreased relative to an upper produced with existing methods.

Another possible benefit compared with braiding over a last is that the modularity of the production process may be increased. For example, at least one braided component could be wound on a spool and transported for further assembly elsewhere. The braided component and/or this method could also be used for producing only part of an upper, for instance, a tubular region with a high stiffness in a radial direction.

The suitability and advantages of this production method are not limited to the production of an upper for an article of footwear. A braided component produced using this method could be equally used for apparel such as, for instance, a sleeve, or socks.

The selection of yarns and the number of bobbins used in the braiding setup will determine a default diameter of the resulting braided tube and prevent the tube from collapsing. For a given braiding angle, the yarn diameter needed and the number of bobbins utilized are interdependent and inversely-related. The fewer bobbins used for braiding, the higher the tex or denier value of the yarn needs to be. The opposite is also true, with a finer yarn requiring more bobbins in order to establish the same resting diameter of the tube. As an illustrative example, on a machine set up with 64 bobbins for braiding and 32 bobbins for axial yarns, braiding yarns of at least 12 tex or at least 18 tex might be utilized. The yarns may have a non-circular cross-section (and in some cases may be referred to as lenticular yarns). For example, the yarns may have an ellipsoidal cross-section with a first axis of a first diameter and a second axis of a second diameter. A ribbon or a tape could also be used alternatively or additionally to a yarn.

The filling space or cover factor of a yarn is the volume of the yarn. This filling space dictates the density of the tube wall. When the filling space is too small, the density of the tube is too small and a forming mandrel is required. When a filling space is large enough, the engineered tube may be able to maintain its shape already during the braiding (and afterwards, even without requiring further treatment), thus removing the need for a forming mandrel.

A first type of axial yarn may have a different composition than a second type of axial yarn. Here, a different composition could comprise a different material such as cotton, polyester, nylon, polypropylene, polybutylene terephthalate, elastane, cellulosic, Kevlar, other polyamides, PET, or combinations thereof. Said materials are lightweight and are easy to process with a braiding machine. A different composition could also mean multifilament on the one hand and monofilament yarn on the other hand. This improves the extent to which the properties of the braided component may be engineered. A different composition could, for example, be used to modify the properties of the braided component according to their breathability or the level of water-resistance.

A first type of axial yarn may comprise a different tex value than a second type of axial yarn. This is an alternative or additional way in which the properties of the braided component could be engineered. For example, it may be beneficial to use yarns comprised of the same material such that certain properties, for instance friction, are the same yet there remains a way to engineer the properties of the braided component by using a different tex value. A variation in tex value will allow the stability and strength of the braided component to be tuned.

A first type of axial yarn may comprise a different elasticity and/or bending stiffness than a second type of axial yarn. This is another alternative or additional way in which the properties of the braided component could be engineered. For example, a first type of yarn could comprise less elastic yarn while a second type of yarn could comprise more elastic yarn to allow the elasticity of the material to be tuned. Alternatively, or additionally, a first type of axial yarn may have a higher bending stiffness than a second type of axial yarn in order to engineer a portion of the braided component that is substantially rigid and another portion that is substantially flexible.

The arrangement of the axial yarns may vary over the circumference of the tubular structure. Such an arrangement would allow for a way to achieve a particularly good fit and comfort of the article of footwear or apparel. For example, using elastic yarns on one side of the tube and less elastic yarns on the opposite side will result in a non-cylindrical structure when the braiding tension is released and the elastic yarns contract deforming the shape. The mechanical properties could additionally or alternatively also vary in other ways over the circumference of the tubular structure, such as, for example, by their bending stiffness. The density of the axial yarns could also vary around the circumference of the braided component. This allows the braided component, for example, to develop a left/right and/or top/bottom bend to conform to the anatomical shape of a body part, for example a left or right foot, without the need for any forming agent such as a shoe last. Furthermore, a desired level of structural support may be achieved for each part of the braided component to improve the performance of the final product and/or the response experienced by an athlete.

The braiding yarns bind the axial yarns into a tubular structure and may be finer than the axial yarns. By choosing the properties of the braiding yarns, such as their composition, elasticity, tex value, or bending stiffness it is possible to engineer the extent of radial elasticity of the tubular structure and improve their wearing comfort and functionality.

The braiding angle may vary along an axial direction of the braided component. The braiding angle is the angle between the direction of the braiding yarns and the axial braiding direction. The variation in braiding angle yields different mechanical properties throughout the length of the tube. In some embodiments, a region with a low braiding angle, e.g., between 15° and 45°, is radially easy to expand, and can allow for expansion for fit during a dynamic movement. In some embodiments, a region with a high braiding angle, e.g., between 46° and 80°, on the other hand is radially less extensible and stiffer. At a very high braiding angle, the braided yarns are jammed in a non-axial direction. Jamming is the point at which there is no more natural expansion from a structural aspect of the braid and further expansion is linked to the strain of the filaments and yarns within it. In the case of a shoe upper, this jamming may be used in regions where stability is required to complement or replace reinforcement structures.

The braiding yarns and/or the axial yarns may comprise at least one melt yarn. In some embodiments, melt yarns melt at a specific temperature that is lower than the decomposition temperature of other yarns in the braided component. The inclusion of a melt yarn has the advantage of allowing the melting and fusion of selected yarns at a particular temperature.

A first type of axial yarn may be arranged in a first area of the braided component, but not in a second area, and wherein a second type of axial yarn is arranged in the second area, but not in the first area. By selectively choosing one type of axial yarn for a specific area and another type for another area it is possible to locally modify the properties of the braided component. This way a particularly good fit, comfort, and improved functionality of the article of footwear or apparel may be achieved.

The braiding of the braided component may be performed over an essentially cylindrical form. An essentially cylindrical form is any form that broadly resembles a cylinder and is not limited to a mathematically perfect cylindrical shape. The form may comprise deviations from a perfect cylinder due to imperfections in manufacturing processes, or it may comprise deliberate deformations from a perfect cylinder. By braiding over an essentially cylindrical form, it is possible to achieve a desired braiding diameter that may be larger than the natural void determined by the space of the total yarns used. In some embodiments, braiding takes place along a longitudinal (or axial) direction of the essentially cylindrical form.

The essentially cylindrical form may comprise a meltable component and the method may further comprise the step of melting said meltable component after braiding the braided component over said meltable component such that the braided component and the meltable component form one integral unit. This way, the stability of the formed integral unit, which will also be referred to as braided component, is improved. Furthermore, the braided component is more waterproof.

The braiding machine may include multiple yarn carriers arranged in a creel where one set of yarns rotates in a clockwise direction and a second set of yarns rotates in a counter-clockwise direction. The braiding yarns are brought together and the overlapping of the yarns creates a braided structure. The speed at which the yarn packages move through a rotation is the braiding speed. The braiding machine has the ability to include axial yarns which may come from the same package arrangement as the braiding yarns or from a separate creel arrangement.

The braided component may be pulled (also known as "take-up") by a mechanical device (also known as "take-up device") at a speed ("take-up speed"). The take-up device could be a roller or pulley system or a robotic device with multi-axis control. Variation of the ratio of take-up to braiding speed is possible. This, along with a yarn tension, can influence the braiding angle and thus the mechanical properties of regions of the tube. The take-up device may include some directly heated surfaces to melt specific regions of the braid in order to fix the structure and prevent unravelling of the braid during cutting. The take-up device may also include a nip roller disposed near a braid formation zone which prevents a longitudinal transmission of tension while providing for variance in braiding angle.

Different braiding machines may be used to construct the tube. A so-called "maypole braider" where the packages are mounted in a ring around a braiding aperture could be used. In this arrangement, the axial yarns could be mounted on a conventional creel allowing for large yarn packages to be mounted, minimizing package change time. Alternatively, a "radial braider" could be used wherein the braiding and axial yarn packages are mounted radially around the braiding zone. Such an arrangement minimizes the total footprint of the device.

The braiding machine may be a 3D braiding machine. A 3D braiding machine involves the mounting of the yarn packages in a Cartesian grid arrangement where the direction of yarns is not necessarily linear. In a 3D braiding machine, the yarn packages are free to move in a two-dimensional place, as opposed to maypole or radial braiding machines, where the yarn packages' motion is constrained to predefined orbits around the braiding zone. In this arrangement, the shape and construction of the braid may be strongly influenced by the programmable movement of yarns. This has the advantage of being able to place yarns in a way that is not possible with other braiding machines such as radial braiding machines or axial (maypole) braiding machines. The use of a 3D braiding machine also allows for standing yarns to begin interlacing at a given point so as to become braiding yarns and vice versa. This method also allows for the introduction and subsequent hiding of color in different regions of the braided component through the ability to "park" yarn paths to positions where they are no longer part of the braid. This way it is possible that an axial yarn begins or ends at some point along a longitudinal direction of the tube. This allows, for example, axial yarns of a first type to be arranged in a first area that is longitudinally, i.e. axially, separated from a second area comprising axial yarns of a second type. Along with colored yarns, regions of stiffness could also be introduced in this way by braiding in a stiff element such as Kevlar or other polyamides.

The method may further comprise the step of forming an upper of the article of footwear comprising the braided component manufactured as described herein. An upper formed from said braided component provides a particularly good fit, has excellent mechanical properties, and a low weight.

The first area may be located in a bottom portion of the upper and the second area may be located in an instep portion of the upper. In such an arrangement, it is easy to accommodate for the different requirements for an upper in a bottom portion and an instep portion. For example, an upper may not have to be particularly waterproof in a bottom portion since the sole is the primary element for providing water resistance to the lower foot. Instead, a high breathability may be desired for wearer comfort. In an instep portion on the other hand, the upper is the primary element to protect a foot from dirt and rain and therefore a good level of water resistance may be required. Similarly, the upper is the primary element that supports the wearer's foot in the instep region and therefore a stable yet flexible braided portion may be required in the instep region. Since the bottom portion of the upper is attached to a sole in an article of footwear, the bottom portion of the upper does not have to support the wearer's foot and therefore may be less stable and could include a soft material for cushioning for improved wearing comfort.

The first area may be located in a lateral and/or medial portion of the upper and the second area may be located in an instep portion of the upper. In such an arrangement, it is easy to accommodate for the different requirements for an upper in a lateral and/or medial portion on the one hand and an instep portion on the other hand. For example, a foot typically requires more support in a lateral or medial portion than it requires in an instep portion.

The first area may be located in a lateral portion of the upper and the second area may be located in a medial portion of the upper. In such an arrangement, it is easy to accommodate for the different requirements for an upper in a lateral portion on the one hand and a medial portion on the other hand. For example, using elastic yarns in a medial portion of the upper and inflexible yarns on the lateral portion of the upper will result in a natural bend that essentially conforms to a human foot when the braiding tension is released.

The method may further comprise the steps of arranging the braided component on a last and consolidating the lasted braided component. Additionally or alternatively, the upper may comprise a braided component that was arranged on a last and consolidated. In addition to the advantages mentioned elsewhere herein, a braided component engineered as described herein has the advantage that during the lasting stage, the last may be a standardized last, that does not need to cover ever shoe style or size, such as, for example, 40, 40.5, 41, 41.5 etc. in the European system or 8, 8.5, 9, 9.5 etc. in the US system. Instead, the engineered properties of the braided component allow for a more standardized last to be used that, for example, covers a range of shoe styles and sizes, for example 40-42 in the European system or 8-10 in the US system. By arranging the engineered braided component on a last and consolidating the lasted braided component, it is possible to achieve a particularly good fit for comfortable wearing properties. It is also possible that the lasting and/or consolidation takes place in a store based on a last that is individually customized for a customer.

The step of consolidating may comprise using a binder, a polymer coating, and/or heating at least on a part of the braided component. In some embodiments, this method allows the permanent fixing of the braided component in its lasted form, while maintaining sufficient elasticity and also providing a sufficient level of resistance to water and breathability. For example, the finished upper may comprise the braided component in its lasted form, while maintaining sufficient elasticity and also providing a sufficient level of resistance to water and breathability. By heating the braided component it is possible to consolidate the structure in key locations, for example if a melt yarn is incorporated into the braided component, while maintaining overall low weight and excellent breathability.

The step of consolidating may further comprise the application of a lamination technique. Thus, the upper may be laminated. Lamination techniques are useful to provide a waterproof and even consolidation. Thus an upper comprising a laminated braided component may be particularly waterproof and have an even surface (e.g., with only small levels of imperfections due to the manufacturing process) and thus have an attractive optical appearance.

The lamination technique may comprise the use of material such as polyurethane, TPU, polyamides, polyolefins, or vinyl-based films. These materials have good adhesive and sealing properties, are easy to process on an industrial scale and have low toxicity. Polyamides, such as Kevlar, are particularly useful due to their heat resistance and structural strength.

The lamination technique may comprise vacuum forming. By vacuum forming it is possible to achieve a particularly waterproof and even lamination with a particularly attractive optical appearance.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Some embodiments of the present invention will be described in the following detailed description primarily with reference to a sports shoe. It is stressed, however, that the present invention is not limited by these embodiments. For example, in particular, the braided component and the methods for manufacturing said braided component may be used as only part of an upper for an article of footwear, or for apparel such as, for example, sleeves or socks.

In the following only some possible embodiments of the invention are described in detail. The person skilled in the art is aware that these possible embodiments may be modified in a number of ways and combined with each other whenever compatible and that certain features may be omitted in so far as they appear dispensable.

FIG. 1A shows an example of a shoe upper 11 according to some embodiments. The upper 11 comprises a first type of axial yarns 13a and a second type of axial yarns 13b.

The first type of axial yarns 13a is located in a lateral portion of the upper and the second type of axial yarns 13b is located in an instep portion of the upper. Alternatively, the first area could be located in a bottom portion of the upper and the second area could be located in an instep portion of the upper. Another alternative is that the first area is located in a lateral portion of the upper and the second area is located in a medial portion of the upper. The at least two types of axial yarn may differ in their composition, such as the material from which they are formed or the nature of their filament (single filament, multifilament etc.). For example, the axial yarns 13b may comprise multifilament yarn comprising elastane, polyester, nylon, polypropylene, polybutylene terephthalate, cellulosic, or combinations thereof, to provide a relatively strong yet flexible and comfortable instep portion of the upper. The axial yarns 13a may comprise a stiff element such as Kevlar, and/or other polyamides, alternatively or additionally to the above listed materials. This way, a rather stiff lateral portion may be achieved to provide a good level of support for a foot. Additionally, or alternatively, the first type of axial yarn may comprise a different tex value than the second type of axial yarn. Additionally, or alternatively, the first type of axial yarn may comprise a different elasticity and/or bending stiffness in a second type of axial yarn.

Braiding yarns 12 are formed such that they bind the axial yarns together to form a braided component. In some embodiments, the upper is arranged on a shoe last and consolidated using a binder, a polymer coating, and/or heating at least part of the braided component. Additionally, or alternatively, consolidation could comprise the application of a lamination technique. A laminated shoe upper is particularly waterproof and a laminated surface is especially even and thus has an attractive optical appearance. The lamination may comprise the materials polyurethane, TPU, polyamides, polyolefins, or vinyl-based films. These materials have good adhesive and sealing properties, are easy to process on an industrial scale and have low toxicity. Polyamides, such as Kevlar, are particularly useful due to their heat resistance and structural strength. The lamination technique may comprise vacuum forming for a particularly waterproof sealing and a smooth and even finish that is optically appealing.

Figure 1B:
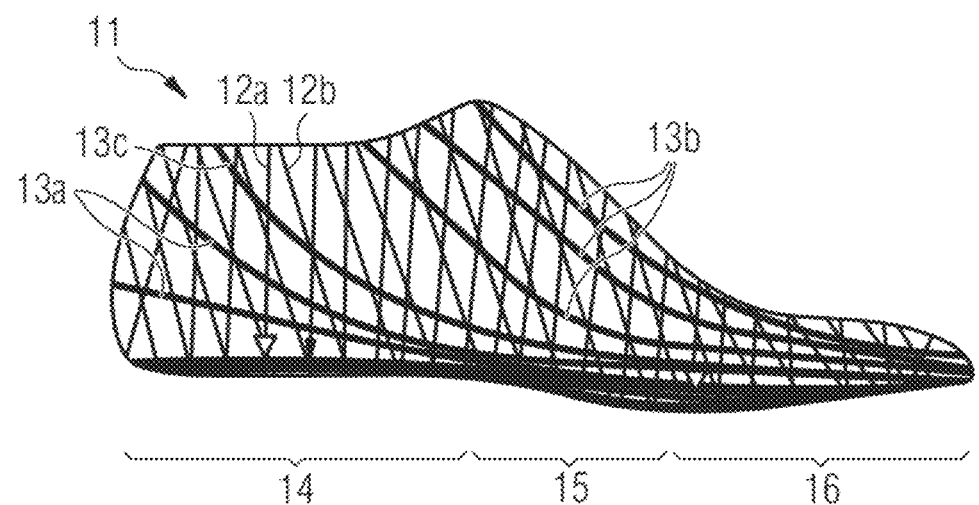

FIG. 1B shows another example of a shoe upper 11 according to some embodiments. The upper 11 comprises axial yarns 13a, 13b, 13c and braiding yarns 12a, 12b. Here, the axial yarns 13c comprise melt yarns whereas the axial yarns 13a, 13b do not comprise melt yarns. The braiding yarns 12b also comprise melt yarns whereas other braiding yarns 12a do not comprise melt yarns. In some embodiments, the melt yarns 12b, 13c are molten after the upper is arranged on a shoe last to facilitate the consolidation of the lasted upper. The advantage of an upper comprising melt yarns is that a minimal amount of additional adhesive or sealant or lamination is required during consolidation. In some embodiments, no additional adhesive or sealant or lamination may be required at all. This way an excellent breathability of the upper is maintained and the produced upper is very lightweight.

Figure 2:
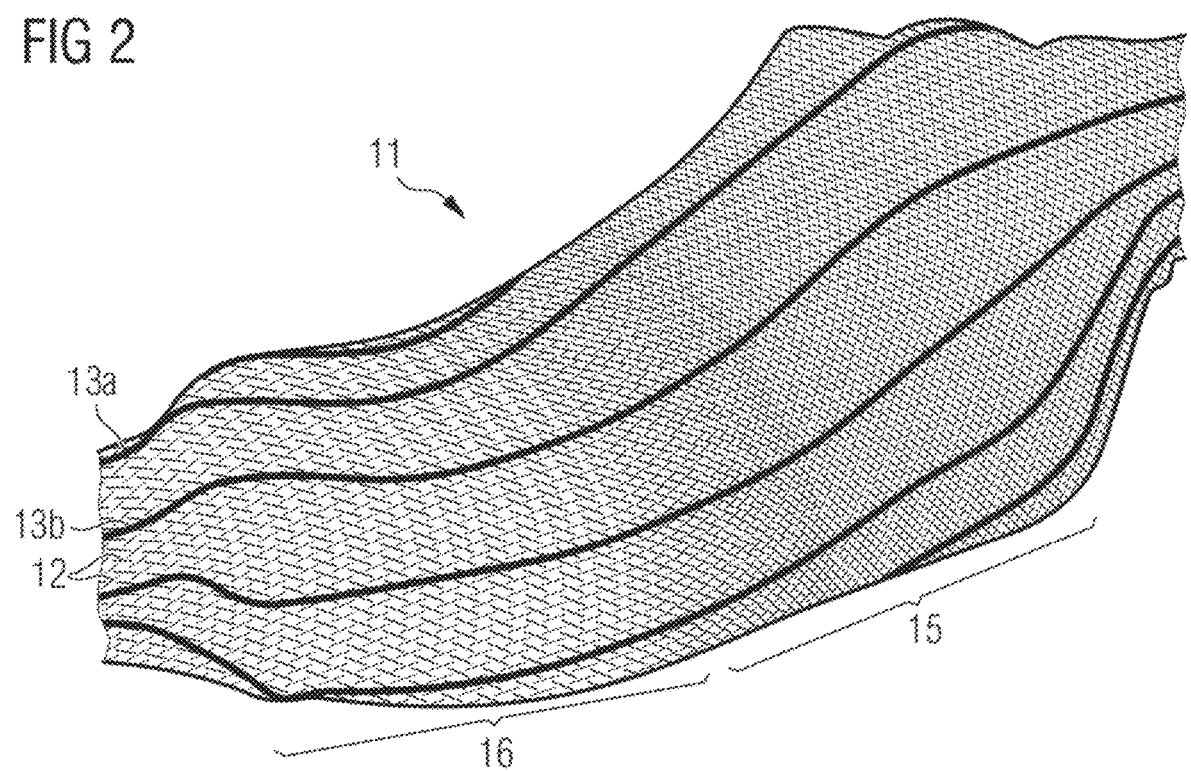
FIG. 2 is a perspective view of another example of a shoe upper according to some embodiments of the present invention.

FIG. 2 shows an example of an upper 11 according to some embodiments. In this example, the upper comprises axial yarns 13a, 13b and braiding yarns 12. The braiding angle is the angle between the braiding direction (e.g., which is essentially parallel to the direction of the axial yarns 13a, 13b), and the direction of a given braiding yarn 12. In FIG. 2, the braiding angle varies along an axial direction of the braided component. The braiding angle is smaller in the forefoot region 16 allowing for flexibility and comfort in the forefoot region. In the midfoot region 15 the braiding angle is larger allowing for stability in the midfoot region 15.

Figure 3:
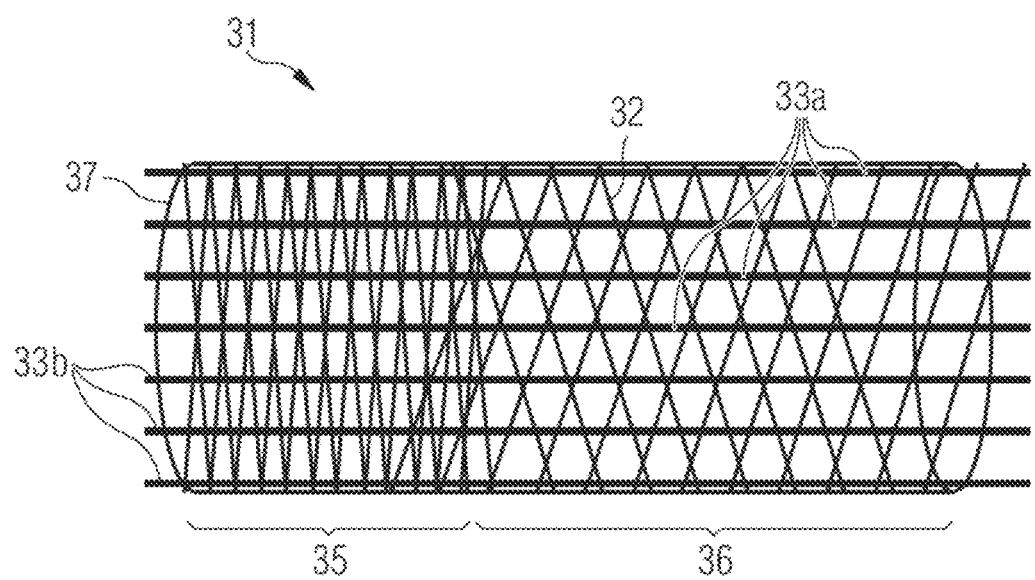
FIG. 3 is a view of an example of a braided component according to some embodiments of the present invention.

FIG. 3 shows an example of a braided component 31. FIG. 3 illustrates the variation in braiding angle along a longitudinal direction of the tube. The braided component comprises a first type of axial yarn 33a and a second type of axial yarn 33b. In FIG. 3, the arrangement of the axial yarns 33a, 33b varies over the circumference of the tubular structure formed by the braided component 31. The braided component further comprises braiding yarns 32 that bind the axial yarns 33a, 33b to form a braided component 31.

In FIG. 3, the braiding angle varies along an axial direction of the braided component. The braiding angle is larger in a first region 35 than in a second region 36. The resulting braided component will therefore be radially stiffer and less flexible in the first region 35 than in the second region 36.

In one example, the braided component 31 could be used to form a sock and the stiff region 35 could be located in an ankle region of the sock while the flexible region 36 could be located in the toe region of the sock. The flexible region 36 could also be located in a calf region of the sock. The flexible region 36 could also be designed to be under high elastic tension while the sock is worn such as to provide a compression effect. This compression effect may be desired for medical and/or athletic purposes.

In another example, the braided component 31 could be used to form a sleeve and the stiff region 35 could be located in an elbow region of the sleeve to prevent overstretching of the elbow while the flexible region 36 could be located in a forearm region of the sleeve for wearing comfort.

In another example, the braided component 31 could be used to form a stiff "cage" comprising only the stiff region 35 to form part of a shoe upper that may comprise additional components.

In another example, the braided component could be used to form a shoe upper and the stiff region 35 could be located in the midfoot region 15 to provide a sufficient level of support and stability while the flexible region 36 could be located in a toe region 16 and/or a heel region 14 to provide wearing comfort.

The braided component 31 could be formed by braiding over an essentially cylindrical form 37. However, this is optional and not an essential aspect of some embodiments of the present invention. The essentially cylindrical form may have deviations from a mathematically perfect cylindrical form due to imperfections in the manufacturing process of the cylindrical form 37 or it may have deliberate deviations from a perfect cylinder. The essentially cylindrical form 37 may comprise a meltable component. In a further step, the meltable component of the essentially cylindrical form 37 could be heated and molten after braiding the braided component over the essentially cylindrical form 37 comprising a meltable component. The product is allowed to cool and set such that the braided component and the meltable component form one integral unit. This integral unit is then processed further. For instance, it could be slit open to make a flat piece of lightweight and waterproof material that may be used for further processing. Further processing may comprise arranging the integral unit, which will also be called braided component, on a shoe last. The lasted braided component could then be consolidated as described in the other examples, where consolidation may comprise a second heating cycle. The first type of axial yarns 33a, may be of rather high elasticity while the second type of axial yarns 33b may be of rather low elasticity. This way, during the melting process of the cylindrical form 37 or alternatively when the braided component 31 is removed from the cylindrical form 37, due to the loss of tension the braided component 31 will deform naturally into a non-cylindrical shape with a natural up/down and/or left/right deformation.

FIG. 4 shows a view along a longitudinal direction of an example of a braided component according to some embodiments. The braided component comprises a first type of axial yarn 13a and a second type of axial yarn 13b. In this example, the arrangement of the axial yarns 13a, 13b varies over the circumference of the tubular structure formed by the braided component 31. Only axial yarns of the first type 13a are arranged on the first side 45, while the second side 46 comprises axial yarns of both the first type 13a and the second type 13b. Furthermore, the circumferential density of axial yarns is higher on the first side 45 than on the second side 46. The braided component further comprises braiding yarns 12 that bind the axial yarns 13a, 13b together to form a braided component 31.

In an example, the braided component could be used to form a shoe upper. The first side 45 may be located in a lateral portion of the upper and the second side 46 may be located in a medial portion of the upper. In such an arrangement, it is easy to accommodate for the different requirements for an upper in a lateral portion on the one hand and a medial portion on the other hand. For example, if the first type of axial yarns 13a is less elastic than a second type of axial yarns 13b, the upper will obtain a natural bend that essentially conforms to a human foot when the braiding tension is released.

In another example, the second type of axial yarn 13b is a melt yarn while the first type of axial yarn 13a is not a melt yarn. The melt yarn 13b serves the purposes of fixing the braided component permanently for example to prevent unravelling after braiding or at a consolidation stage.

FIG. 5 shows a schematic example of a method for making a braided component and an upper for an article of footwear according to some embodiments. In a first step, a braiding machine 57, which could be a radial, axial, or 3D braiding machine, is used to braid a braided component 31a. The braided component comprises at least two types of axial yarns 13a, 13b and braiding yarns 12. Braiding yarns 12 are provided by a number of braiding yarn packages 58 mounted on bobbins. Several different types of axial yarns 13a, 13b may be provided, for example, via a number of axial yarn packages 56 mounted on the static braiding frame. Alternatively, the axial yarn packages 56 may be mounted off the braiding machine on a creel (not shown) with the axial yarns 13 guided to the braiding apparatus via tubing or eyelets. A take-up device (not shown) may be used to pull the braided component away from the braiding zone. This is shown and discussed in more detail in reference to FIGS. 6A and 6B.

The selection of yarns and the number of bobbins used in the braiding setup may determine a default diameter of the resulting braided tube and prevent the tube from collapsing. For a given braiding angle, the yarn diameter needed and the number of bobbins utilized are interdependent and inversely-related. The fewer bobbins used for braiding, the higher the tex or denier value of the yarn needs to be. The opposite is also true, with a finer yarn requiring more bobbins in order to establish the same resting diameter of the tube. In an illustrative example, on a machine set up with 64 bobbins for braiding and 32 bobbins for axial yarns, braiding yarns of at least 12 tex or at least 18 tex could be used. The yarns may have a non-circular cross-section (and in some cases may be referred to as lenticular). For example, the yarns may have an ellipsoidal cross-section with a first axis of a first diameter and a second axis of a second diameter. A ribbon or a tape could also be used alternatively or additionally to a yarn.

The filling space or cover factor of a yarn is the volume of the yarn. This filling space dictates the density of the tube wall. When the filling space is too small, the density of the tube is too small and a forming mandrel is required. When a filling space is large enough, the engineered tube may be able to maintain its shape already during the braiding (and afterwards, even without requiring further treatment), thus removing the need for a forming mandrel. This way, the production speed of a braided component may be increased.

In a second step, the braided component 31a is arranged over a shoe last 59, which could be formed based on an individual model of a customer's foot. The second process may be performed in a factory or in a store. In a third step the lasted braided component 31b is consolidated.

By arranging the braided component on a last and consolidating the lasted braided component, it is possible to achieve a particularly good fit for comfortable wearing properties. In addition to the advantages mentioned elsewhere herein, a braided component engineered as described herein has the advantage that during the lasting stage, the last may be a standardized last, e.g., that does not need to cover ever shoe style or size, such as, for example, 40, 40.5, 41, 41.5 etc. in the European system or 8, 8.5, 9, 9.5 etc. in the US system. Instead, the engineered properties of the braided component allow for a more standardized last to be used that, for example, covers a range of shoe styles and sizes, for example 40-42 in the European system or 8-10 in the US system.

The step of consolidating may comprise using a binder, a polymer coating, and/or heating at least part of the braided component. In some embodiments, this method allows the permanent fixing of the braided component in its lasted form, while maintaining sufficient elasticity and also providing a sufficient level of resistance to water and breathability. By heating the braided component it is possible to consolidate the structure in key locations, for example if a melt yarn is incorporated into the braided component, while maintaining overall low weight and excellent breathability.

The step of consolidating may further comprise the application of a lamination technique. Lamination techniques are useful to provide a waterproof and even consolidation.

The lamination technique may comprise the use of polyurethane, TPU, polyamides, polyolefins, or vinyl-based films. These materials have good adhesive or sealing properties are easy to process on an industrial scale and have low toxicity. Polyamides, such as Kevlar, are particularly useful due to their heat resistance and structural strength.

The lamination technique may comprise vacuum forming. By vacuum forming it is possible to achieve a particularly waterproof and even lamination.

The consolidated braided component 31c may be used as an upper for an article of footwear which can then be attached to an outsole using, for example, a glue, lamination techniques, welding, and/or sewing (for example with a Strobel sewing machine) to form a lightweight shoe with a high mechanical performance.

Figure 6A:
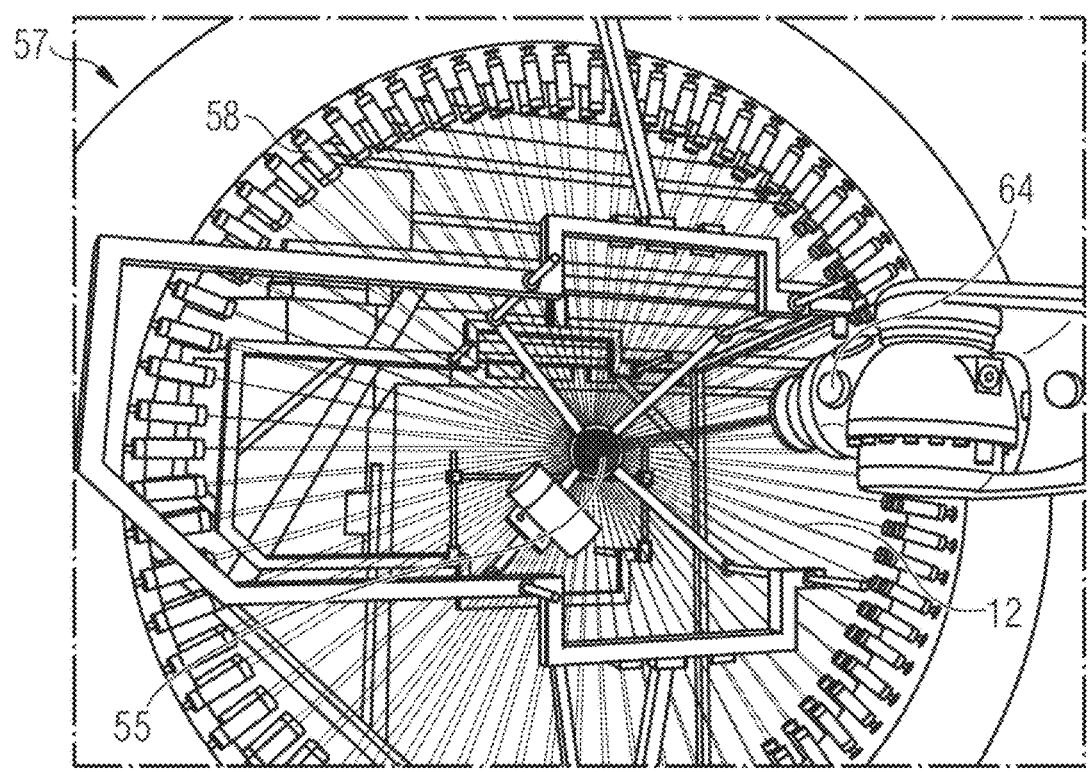
FIGS. 6A and 6B illustrate an example of a braiding machine that may be utilized in some embodiments of the present invention.
Figure 6B:
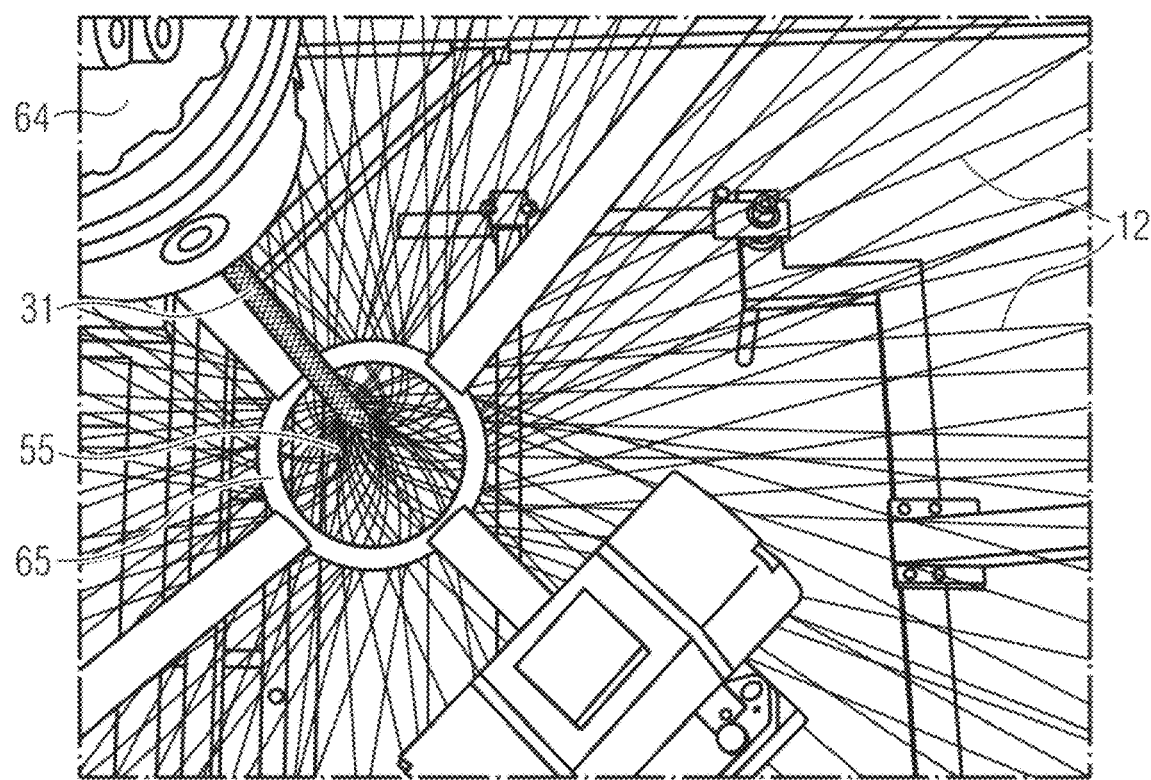

FIGS. 6A and 6B show an example of a braiding machine 57 that could be used to produce a braided component according to some embodiments. In this case, the braiding machine is a radial braiding machine but an axial, maypole, or 3D braiding machine can equally be used to produce a braided component according to various embodiments. Braiding yarn packages 58 are mounted in bobbins to provide the braiding yarns 12 to the braiding zone 55 in which the braided component 31 is formed. Several different types of axial yarns may be provided, for example, via a number of axial yarn packages mounted on the static braiding frame (not shown). Alternatively, the axial yarn packages may be mounted off the braiding machine on a creel (not shown) with the axial yarns guided to the braiding apparatus via tubing or eyelets.

A take-up device 64 pulls the braided component 31 at a take-up speed. A ring 65 ensures the stability of the braiding zone 55. The take-up device 64 could be a roller or pulley system or a robotic device with multi-axis control. Variation of the ratio of take-up to braiding speed is possible. This, along with a yarn tension, can influence the braiding angle and thus the mechanical properties of regions of the tube. The take-up device 64 may include some directly heated surfaces to melt specific regions of the braid in order to fix the structure and prevent unravelling of the braid during cutting. There is no forming mandrel required with this arrangement.

Figure 7A:
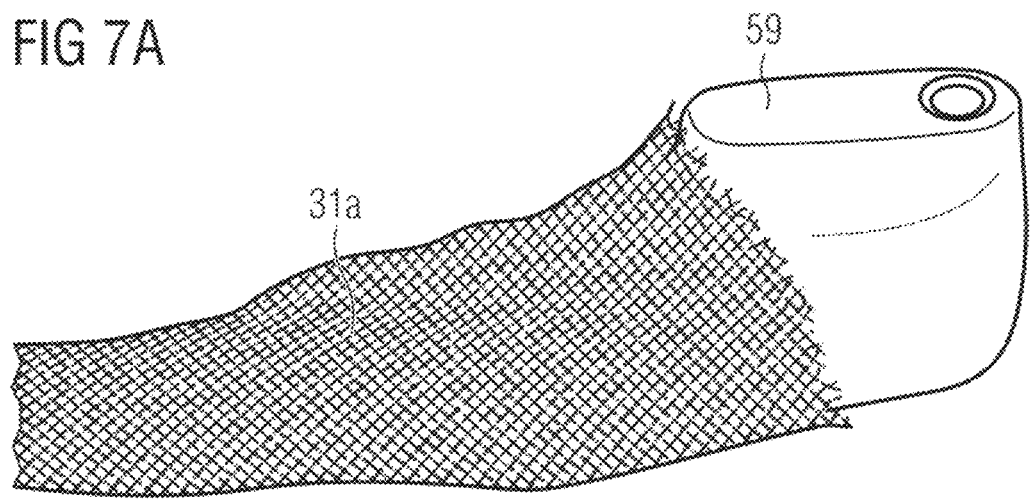
FIGS. 7A and 7B illustrate an example of a method of lasting a braided component according to some embodiments of the present invention.
Figure 7B:
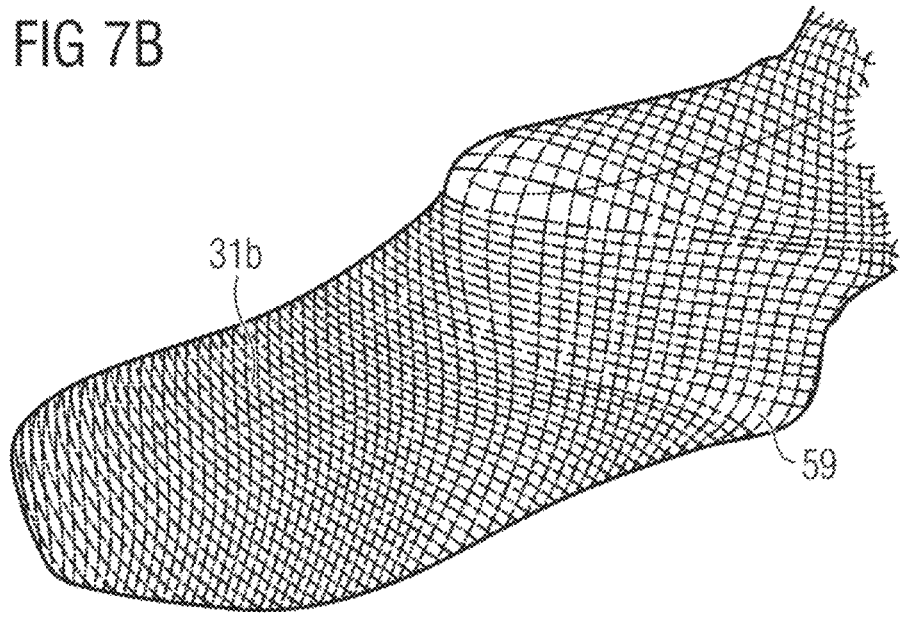

FIGS. 7A and 7B illustrate an example of a method relating to how a braided component 31a may be arranged on a shoe last 59. Note that the axial yarns have been omitted for clarity here. It is however evident to the person skilled in the art that this method is fully compatible with a braided component comprising axial yarns according to some embodiments. The lasted braided component 31b may be consolidated further as described herein in order to form an upper for an article of footwear.

Figure 8:
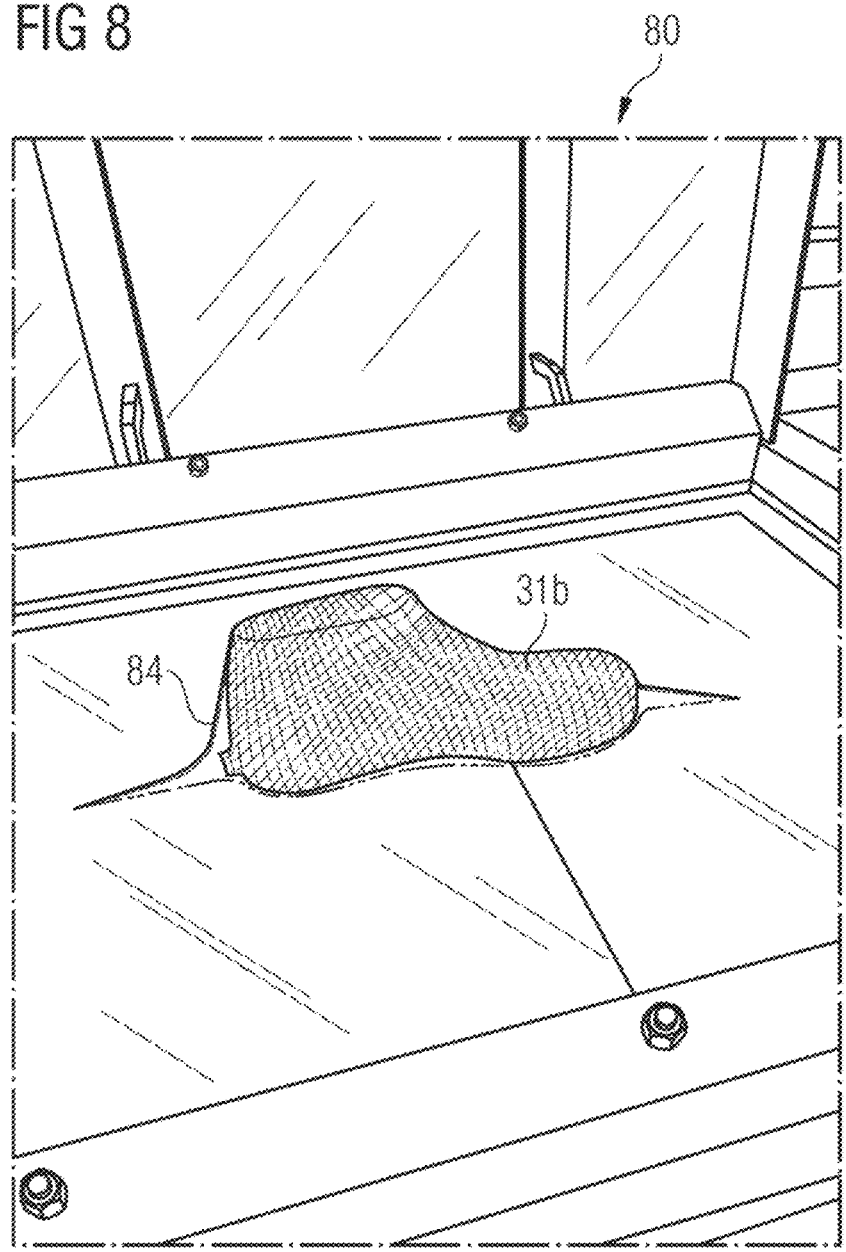
FIG. 8 illustrates an example of a method of vacuum-laminating a braided component according to some embodiments of the present invention.

FIG. 8 shows an oven that may be used for vacuum lamination of a lasted braided component 31b for producing an upper for an article of footwear. An air-proof lamination material 84 is placed on the braided component 31b. The space between the lamination material 84 and the braided component 31b is then evacuated. The lamination material may have an adhesive layer on the side facing the braided component. Additionally, or alternatively, the oven may be used to provide heat in order to melt the lamination material to provide a permanent attachment and a good seal. The resulting upper is particularly waterproof with an even lamination with a particularly attractive optical appearance.

Figure 9:
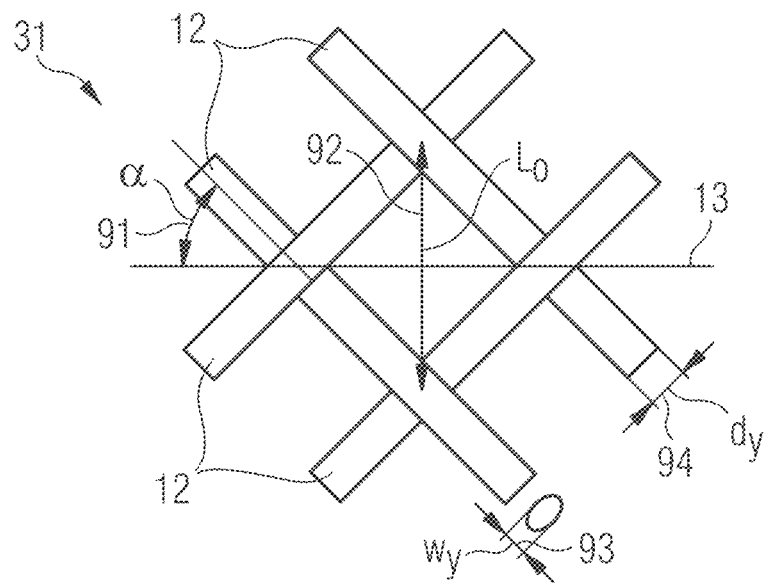
FIG. 9 illustrates an example of a braided pattern showing the braiding angle according to some embodiments of the present invention.

FIG. 9 shows a small-scale view of part of an example of a braided component 31 with a biaxial braid. Braiding yarns 12 are braided together with an axial yarn 13 to form a braided component 31. The braiding angle α 91 is the angle between a direction of a braiding yarn and the axial yarn 13 (e.g., which is substantially along an axial direction of the braided component 31). For simplicity, only a single axial yarn is shown. The second type of axial yarn is located at a different position in the braided component. The braiding yarns may have a non-circular cross-section (and in some cases may be referred to as lenticular). In this example, the braiding yarns have a substantially ellipsoidal cross-section with a length $w_y$ 93 of a first axis and a length $d_y$ 94 of a second axis.

The braided component 31 has a unit cell that is substantially similar to neighboring unit cells, though not every unit cell may comprise an axial yarn. The diagonal lattice parameter $L_0$ 92 is the distance between diagonally separated interlacement points.

It is known, that the diameter of a braided tube depends on the diagonal lattice parameter $L_0$ 92 and the number of yarn carriers n, also referred to as yarn packages, in the following manner:

$$D = \frac{\frac{n}{2} \times L_0}{\pi}$$

See, for example, Goff, J. R. (1976) "The geometry of tubular braided structures", MSc Thesis, Georgia Institute of Technology.

The diagonal lattice parameter $L_0$ 92 is a function of several parameters, comprising the length $w_y$ of a first axis 93 and a length $d_y$ of a second axis 94 of the braiding yarns, the braiding angle α 91, the thickness of the axial yarn, the braiding pattern, and other parameters:

$$L_0 = f(d_y, w_y, \alpha, \dots)$$

This function is not known analytically, due to various complicating factors comprising the yarn compressibility and the yarn-to-yarn friction.

It is evident from the discussion herein, that the diameter of the braided tube increases substantially linearly with the number n of yarn carriers.

Figure 10:
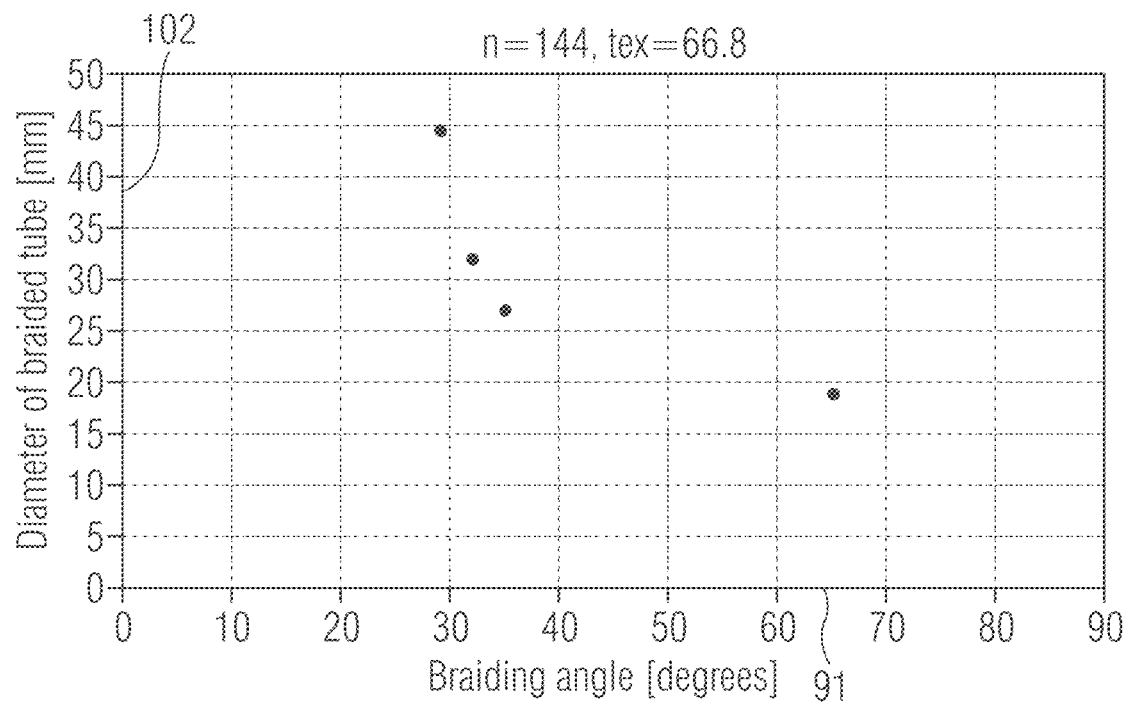
FIG. 10 illustrates an example of a graph showing the dependence of the diameter of a braided tube on the braiding angle according to some embodiments of the present invention.

FIG. 10 shows the measured diameter D 102 of a braided tube made from PET textured multifilament yarns in a braided tube with biaxial braid substantially similar to the braiding pattern shown in FIG. 9. The braided tube was braided using n=144 yarn carriers using braiding yarns with a tex value of 66.8 tex. The tube did not have any incorporated axial yarns but the skilled person will recognize that the method illustrated herein will be substantially similar for a braided tube comprising axial yarns. The tube was braided using these settings with four different braiding angles α 91 and the diameter 102 of the braided tube was then measured.

Measurements like the one shown in FIG. 10, allow the properties of the braided tube to be engineered for a particular purpose.

The braiding angle after lasting, $\alpha_{new}$, may be estimated via the equation:

$$\sin\alpha_{new} = \frac{D}{D_{new}} \sin\alpha$$

where $D_{new}$ is the new diameter of the braided tube after lasting. Thus, if the diameter of the tube after lasting is known based on the geometry of the last, then a particular braided tube diameter D and braiding angle α 91 may be selected to design a shoe upper with an intended braiding angle $\alpha_{new}$.

Figure 11A:
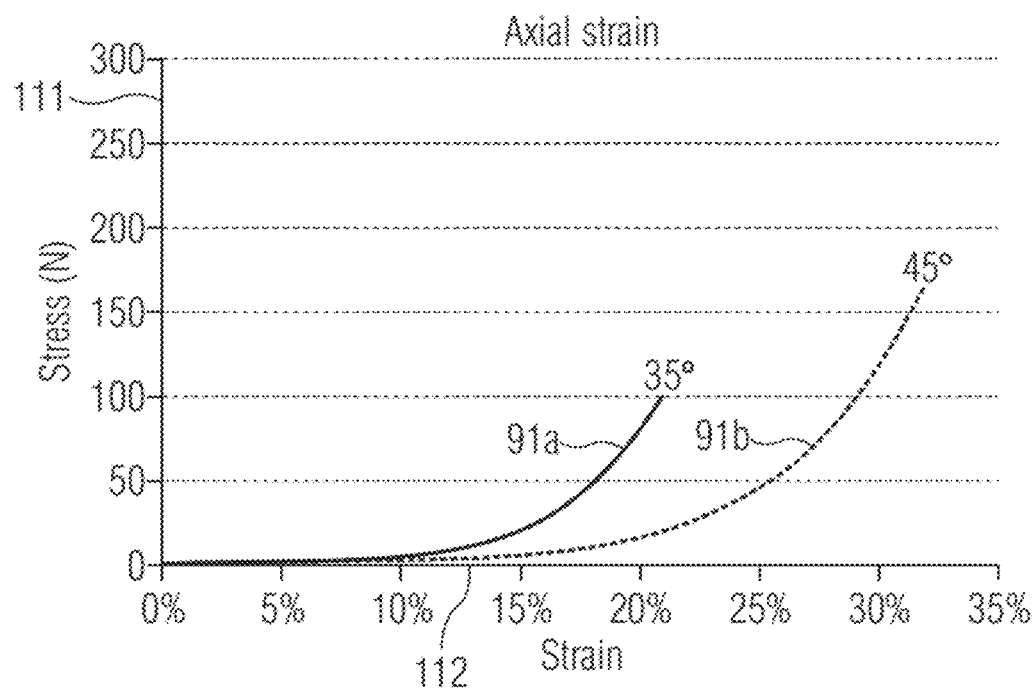
FIGS. 11A and 11B illustrate an example axial stress-strain relationship for a braided tube according to some embodiments of the present invention.

FIG. 11A schematically shows the non-linear strain response of tubular braids with different braiding angles as described in Goff, J. R. (1976) "The geometry of tubular braided structures", MSc Thesis, Georgia Institute of Technology.

FIG. 11A shows the axial stress 111 for a braided tube with a local braiding pattern substantially similar to the pattern shown in FIG. 9. The effect of the axial yarn has been omitted here for illustrative purposes. The stress strain curve is shown for a first braided tube with a first braiding angle 91a of 35 degrees and a second braided tube with a braiding angle 91b of 45 degrees. At low values of axial strain 112, the corresponding stress 111 is approximately linear. However, at higher values of strain, the corresponding stress increases much more rapidly. This onset happens earlier for the lower braiding angle 91a than for the higher braiding angle 91b.

Figure 11B:
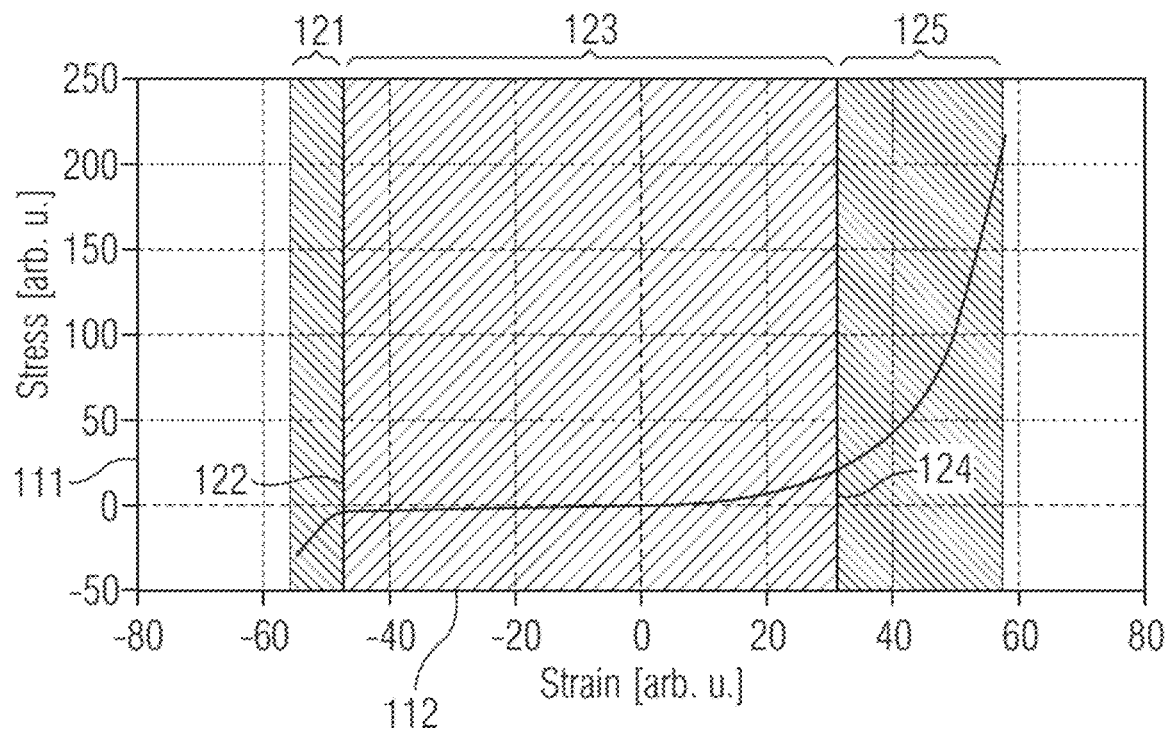

FIG. 11B shows a similar schematic of the axial stress 111 (in arbitrary units) against the axial strain (in arbitrary units) covering both positive (extension) and negative (compression) regions of axial strain 112.

Starting at zero strain, when the strain is increased, the stress increases approximately linearly within the linear regime 123 in which the braid itself can extend structurally. Substantially near the tensile jamming point 124 the stress increases much more rapidly with strain. That is, a much greater force (stress) is required to extend the tube than at lower values of strain. In the strand straining regime 125 any expansion of the tube is primarily due to an extension of the strands itself since any expansion of the braid structure is severely restricted.

Starting at zero strain and decreasing the strain, i.e. compressing the tube along an axial direction, the stress decreases approximately linearly, that is it increases approximately linearly in magnitude within the linear regime 123. Substantially near the compressive jamming point 122, there is an onset below which the stress decreases much more rapidly with decreasing strain in the buckling regime 121. In the buckling regime 121, the braided component 31 is compressed so much that it buckles, resulting in a large increase in magnitude of the stress, when the tube is compressed further.

The axial yarn will contribute an additional component to the stress-strain curve whose functional dependence substantially reflects that of the elasticity of the axial yarn.

The behavior illustrated in FIGS. 11A and 11B, may be used to engineer a tube that provides sufficient flexibility within a certain range of strains, the linear regime 123, but also provides sufficient support for an athlete when the strain lies outside this regime.

In the following, further examples are described to facilitate the understanding of the invention:

1. Method of forming a braided component (31) for an article of apparel or footwear on a braiding machine (57), comprising:

(a) braiding a plurality of braiding yarns (12) to form the braided component with a tubular structure;
(b) incorporating a plurality of axial yarns (13) into the tubular structure during braiding, wherein at least two different types of axial yarn are incorporated into the braided component.

2. Method according to the preceding example, wherein a first type of axial yarn (13a) has a different composition than a second type of axial yarn (13b, 13c).
3. Method according to one of the preceding examples, wherein a first type of axial yarn (13a) comprises a different tex value than a second type of axial yarn (13b, 13c).
4. Method according to one of the preceding examples, wherein a first type of axial yarn (13a) comprises a different elasticity and/or bending stiffness than a second type of axial yarn (13b, 13c).
5. Method according to one of the preceding examples, wherein the arrangement of the axial yarns (13) varies over the circumference of the tubular structure of the braided component (31).
6. Method according to one of the preceding examples, wherein the braiding angle (91) is varied along an axial direction of the braided component (31).
7. Method according to one of the preceding examples, wherein the braiding yarns and/or the axial yarns comprise at least one melt yarn (12b, 13c).
8. Method according to one of the preceding examples, wherein a first type of axial yarn (13a) is arranged in a first area of the braided component (31), but not in a second area, and wherein a second type of axial yarn (13b, 13c) is arranged in the second area, but not in the first area.
9. Method according to one of the preceding examples, wherein the braiding of the braided component (31) is performed over an essentially cylindrical form (37).
10. Method according to the preceding example, wherein the essentially cylindrical form (37) comprises a meltable component and the method further comprises the step of melting said meltable component after braiding the braided component (31) over said meltable component (37) such that the braided component (31) and the meltable component (37) form one integral unit.
11. Method according to one of the preceding examples, wherein the braiding machine is a 3D braiding machine.
12. Method according to one of the preceding examples, further comprising the step of forming an upper (11) of the article of footwear comprising the braided component (31) manufactured according to one of the preceding examples.
13. Method according to examples 8 and 12, wherein the first area is located in a bottom portion of the upper (11) and the second area is located in an instep portion of the upper (11).
14. Method according to examples 8 and 12, wherein the first area is located in a lateral and/or medial portion of the upper (11) and the second area is located in an instep portion of the upper (11).
15. Method according to examples 8 and 12, wherein the first area is located in a lateral portion of the upper (11) and the second area is located in a medial portion of the upper (11).
16. Method according to one of the preceding examples, further comprising the steps of arranging the braided component (31a) on a last (59) and consolidating the lasted braided component (31b).
17. Method according to the preceding example, wherein the step of consolidating comprises using a binder, a polymer coating, and/or heating at least part of the braided component (31b).
18. Method according to one of examples 16 or 17, wherein the step of consolidating comprises the application of a lamination technique.
19. Method according to the preceding example, wherein the lamination technique comprises the use of polyurethane, TPU, polyamide, polyolefins, or vinyl-based films.
20. Method according to one of examples 18 or 19, wherein the lamination technique comprises vacuum forming.
21. An upper (11) for an article of footwear comprising a braided component (31) which has been manufactured according to a method of one of the preceding examples.
22. A braided component for an article of apparel or footwear having a tubular structure, wherein the braided component (31) comprises a plurality of incorporated axial yarns (13), and wherein at least two different types of axial yarn are incorporated into the braided component.
23. The braided component according to the preceding example, wherein a first type of axial yarn (13a) has a different composition than a second type of axial yarn (13b, 13c).
24. The braided component according to one of examples 22 or 23, wherein a first type of axial yarn (13a) comprises a different tex value than a second type of axial yarn (13b, 13c).
25. The braided component according to one of examples 22 to 24, wherein a first type of axial yarn (13a) comprises a different elasticity and/or bending stiffness than a second type of axial yarn (13b, 13c).
26. The braided component according to one of examples 22 to 25, wherein the arrangement of said axial yarns (13) varies over the circumference of the tubular structure of the braided component (31).
27. The braided component (31) according to one of examples 22 to 26, wherein the braiding angle (91) is varied along an axial direction of the braided component (31).
28. The braided component (31) according to one of examples 22 to 27, wherein the braiding yarns and/or the axial yarns comprise at least one melt yarn (12b, 13c).
29. The braided component (31) according to one of examples 22 to 28, wherein a first type of axial yarn (13a) is arranged in a first area of the braided component, but not in a second area, and wherein a second type of axial yarn (13b, 13c) is arranged in the second area, but not in the first area.
30. An upper (11) for the article of footwear comprising a braided component (31) according to one of examples 22 to 29.
31. An upper (11) according to examples 29 and 30, wherein the first area is located in a bottom portion of the upper and the second area is located in an instep portion of the upper.
32. An upper (11) according to examples 29 and 30, wherein the first area is located in a lateral and/or medial portion of the upper and the second area is located in an instep portion of the upper.

33. An upper (11) according to examples 29 and 30, wherein the first area is located in a lateral portion of the upper and the second area is located in a medial portion of the upper.

34. An upper (11) according to one examples 30 to 33, in which the braided component (31a) was arranged on a last (59) and consolidated (31c).

35. An upper (11) according to one of examples 30 to 34, wherein the braided component (31c) was consolidated using a binder, a polymer coating, and/or heating at least part of the braided component.

36. An upper (11) according to one of examples 34 or 35, wherein the braided component (31c) was consolidated by the application of a lamination technique.

37. An upper (11) according to the preceding example, wherein the lamination technique comprises the use of polyurethane, TPU, polyamide, polyolefins, or vinyl-based films.

38. An upper (11) according to one of examples 36 or 37, wherein the lamination technique comprises vacuum forming.

39. A shoe, comprising:
(a) an upper (11) according to one of examples 30-38;
(b) an outsole.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of forming a braided component for an article of footwear on a braiding machine, the method comprising:
braiding a plurality of braiding yarns over an essentially cylindrical element to form the braided component so that the braided component comprises a tubular structure defining at least a midfoot region, wherein the essentially cylindrical element comprises a meltable component, wherein a braiding angle of the braiding yarns is varied along a longitudinal direction of the midfoot region of the braided component;
incorporating a plurality of axial yarns into the tubular structure during braiding, wherein at least two different types of axial yarn including at least a first type of axial yarn and a different, second type of axial yarn are incorporated into the braided component;
after braiding the braided component over said meltable component, melting said meltable component such that the braided component and the meltable component form one integral unit; and
arranging the integral unit on a last.

2. The method according to claim 1, wherein the first type of axial yarn has a different composition than the second type of axial yarn.

3. The method according to claim 1, wherein the first type of axial yarn comprises a different tex value than the second type of axial yarn.

4. The method according to claim 1, wherein the first type of axial yarn comprises at least one of a different elasticity or a different bending stiffness than the second type of axial yarn.

5. The method according to claim 1, wherein an arrangement of the axial yarns varies over a circumference of the tubular structure of the braided component.

6. The method according to claim 1, wherein the tubular structure of the braided component formed by the braiding comprises a first region at a first position along the longitudinal direction of the midfoot region and a second region at a second position along the longitudinal direction of the midfoot region;
wherein braiding yarns are arranged:
in the first region at a first angle relative to the longitudinal direction of the midfoot region; and
in the second region at a second angle relative to the longitudinal direction of the midfoot region, wherein the second angle is smaller than the first angle.

7. The method according to claim 1, wherein at least one of the braiding yarns or the axial yarns comprise at least one melt yarn.

8. The method according to claim 1, wherein the first type of axial yarn is arranged in a first area of the braided component, but not in a second area, and wherein the second type of axial yarn is arranged in the second area, but not in the first area.

9. The method according to claim 8, further comprising forming an upper of the article of footwear from the integral unit after the axial yarns have been incorporated.

10. The method according to claim 9, wherein the first area is located in a bottom portion of the upper and the second area is located in an instep portion of the upper.

11. The method according to claim 9, wherein the first area is located in at least one of a lateral or a medial portion of the upper and the second area is located in an instep portion of the upper.

12. The method according to claim 9, wherein the first area is located in a lateral portion of the upper and the second area is located in a medial portion of the upper.

13. The method according to claim 1, further comprising consolidating the integral unit.

14. The method according to claim 13, wherein consolidating comprises at least one of:
using a binder;
using a polymer coating;
heating at least part of the integral unit; or
application of a lamination technique.

15. The method according to claim 14, wherein the consolidating comprises application of a lamination technique and the lamination technique comprises the use of polyurethane, thermoplastic polyurethane, polyamide, polyolefins, or vinyl-based films.

16. The method according to claim 14, wherein the consolidating comprises application of a lamination technique and the lamination technique comprises vacuum forming.

17. A braided component for an article of footwear having a tubular structure, wherein the braided component comprises a plurality of braiding yarns and a plurality of incorporated axial yarns, wherein at least two different types of axial yarn including at least a first type of axial yarn and a different, second type of axial yarn are incorporated into the braided component, wherein a braiding angle of the braiding yarns is varied along a longitudinal direction of a midfoot region of the braided component, wherein the braided component forms one integral unit with a meltable component, the entire meltable component corresponding to an essentially cylindrical element over which the braided component was braided and which has been melted to form the integral unit with the braided component, wherein the integral unit is arrangeable on a last.

18. The braided component according to claim 17, wherein the first type of axial yarn differs from the second type of axial yarn in at least one of:
   a composition;
   a tex value;
   an elasticity; or
   a bending stiffness.

19. The braided component according to claim 17, wherein at least one of:
   an arrangement of said axial yarns varies over a circumference of the tubular structure of the braided component; or
   the braiding yarns and/or the axial yarns comprise at least one melt yarn.

20. The braided component according to claim 17, wherein an upper for the article of footwear comprises the integral unit, wherein the first type of axial yarn is arranged in a first area of the braided component, but not in a second area, and wherein the second type of axial yarn is arranged in the second area, but not in the first area, and wherein:
   the first area is located in a bottom portion of the upper and the second area is located in an instep portion of the upper;
   the first area is located in at least one of a lateral portion or a medial portion of the upper and the second area is located in an instep portion of the upper; or
   the first area is located in a lateral portion of the upper and the second area is located in a medial portion of the upper.

21. The braided component according to claim 20, wherein the upper comprises a laminate comprising at least one of a polyurethane material, a thermoplastic polyurethane material, a polyamide material, a polyolefin material, or a vinyl-based film.

22. A shoe, comprising:
   an upper comprising a braided component having a tubular structure, wherein the braided component comprises a plurality of braiding yarns and a plurality of incorporated axial yarns, wherein at least two different types of axial yarn including at least a first type of axial yarn and a different, second type of axial yarn are incorporated into the braided component, wherein a braiding angle of the braiding yarns is varied along a longitudinal direction of a midfoot region of the braided component, wherein the braided component forms one integral unit with a meltable component, the entire meltable component corresponding to an essentially cylindrical element over which the braided component was braided and which has been melted to form the integral unit with the braided component; and
   an outsole.

23. The shoe of claim 22, wherein the first type of axial yarn differs from the second type of axial yarn in at least one of:
   a composition;
   a tex value;
   an elasticity; or
   a bending stiffness.

24. The shoe of claim 22, wherein at least one of:
   an arrangement of said axial yarns varies over a circumference of the tubular structure of the braided component; or
   the braiding yarns and/or the axial yarns comprise at least one melt yarn.

25. The shoe of claim 22, wherein the first type of axial yarn is arranged in a first area of the braided component, but not in a second area, and wherein the second type of axial yarn is arranged in the second area, but not in the first area, and wherein:
   the first area is located in a bottom portion of the upper and the second area is located in an instep portion of the upper;
   the first area is located in at least one of a lateral portion or a medial portion of the upper and the second area is located in an instep portion of the upper; or
   the first area is located in a lateral portion of the upper and the second area is located in a medial portion of the upper.

* * * * *